United States Patent
Chi et al.

(10) Patent No.: US 10,607,064 B2
(45) Date of Patent: Mar. 31, 2020

(54) OPTICAL PROJECTION SYSTEM AND OPTICAL PROJECTION METHOD

(71) Applicant: HIMAX TECHNOLOGIES LIMITED, Tainan (TW)

(72) Inventors: Cheng-Hung Chi, Tainan (TW); Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 55 days.

(21) Appl. No.: 15/984,437

(22) Filed: May 21, 2018

(65) Prior Publication Data

US 2019/0354747 A1  Nov. 21, 2019

(51) Int. Cl.
| | |
|---|---|
| *G06K 9/00* | (2006.01) |
| *H04N 5/74* | (2006.01) |
| *G03B 21/20* | (2006.01) |
| *G02B 27/00* | (2006.01) |

(52) U.S. Cl.
CPC ..... *G06K 9/00255* (2013.01); *G02B 27/0093* (2013.01); *G03B 21/2033* (2013.01); *H04N 5/7416* (2013.01)

(58) Field of Classification Search
CPC ............ G06K 9/00255; G02B 27/0093; G03B 21/2033; H04N 5/416
See application file for complete search history.

(56) References Cited

U.S. PATENT DOCUMENTS

| | | | |
|---|---|---|---|
| 8,384,997 B2 | 2/2013 | Shpunt et al. | |
| 8,411,909 B1 | 4/2013 | Zhao et al. | |
| 8,749,796 B2* | 6/2014 | Pesach | G01B 11/25 356/610 |
| 9,857,167 B2* | 1/2018 | Jovanovski | G02B 26/10 |
| 10,225,544 B2* | 3/2019 | Thuries | G06K 9/2036 |
| 2004/0037450 A1 | 2/2004 | Bradski | |
| 2009/0027747 A1* | 1/2009 | Lee | G01B 9/021 359/15 |
| 2015/0078623 A1 | 3/2015 | Karakotsios et al. | |
| 2015/0341619 A1* | 11/2015 | Meir | G01S 17/06 348/47 |
| 2016/0245919 A1* | 8/2016 | Kalscheur | G01S 17/89 |
| 2019/0294106 A1* | 9/2019 | Cheng | G03H 1/04655 |

FOREIGN PATENT DOCUMENTS

| | | |
|---|---|---|
| TW | 583872 B | 4/2004 |
| TW | 200917899 A | 4/2009 |
| TW | 201245919 A1 | 11/2012 |

* cited by examiner

*Primary Examiner* — Gregory M Desire
(74) *Attorney, Agent, or Firm* — CKC & Partners Co., LLC

(57) ABSTRACT

An optical projection system includes an image sensor, a light emitting circuit and a processor. The image sensor is configured to capture an image of a target object. The processor is electrically coupled to the image sensor and the light emitting circuit. The processor is configured to determine a size of the target object, and control the light emitting circuit to emit an optical pattern and to fan out the optical pattern according to the size of the target object, in order to cover the target object.

14 Claims, 11 Drawing Sheets

OPTICAL PROJECTION SYSTEM AND OPTICAL PROJECTION METHOD

BACKGROUND

Technical Field

Present disclosure relates to an optical system and an optical method. More particularly, the present disclosure relates to an optical projection system and an optical projection method for object detection.

Description of Related Art

Face detection is widely applied in many technical fields nowadays. In some approaches, a face detection device (or system) can merely emit light spots in a fixed range. Since a face detection device should be able to adapt to different faces, the conventional approach has to be improved.

SUMMARY

The disclosure relates to an optical projection system. The optical projection system comprises an image sensor, a light emitting circuit and a processor. The image sensor is configured to capture an image of a target object. The processor is electrically coupled to the image sensor and the light emitting circuit. The processor is configured to analyze the image to determine a size of the target object, and control the light emitting circuit to emit an optical pattern and to fan out the optical pattern according to the size of the target object, in order to cover the target object.

Another aspect of present disclosure is to provide an optical projection method. The optical projection method comprises following steps: capturing, by an image sensor of the optical projection device, an image of a target object; analyzing, by a processor of the optical projection device, the image to determine a size of the target object; and controlling, by the processor, a light emitting circuit to emit an optical pattern and to fan out the optical pattern according to the size of the target object, in order to cover the target object.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Figure 1:
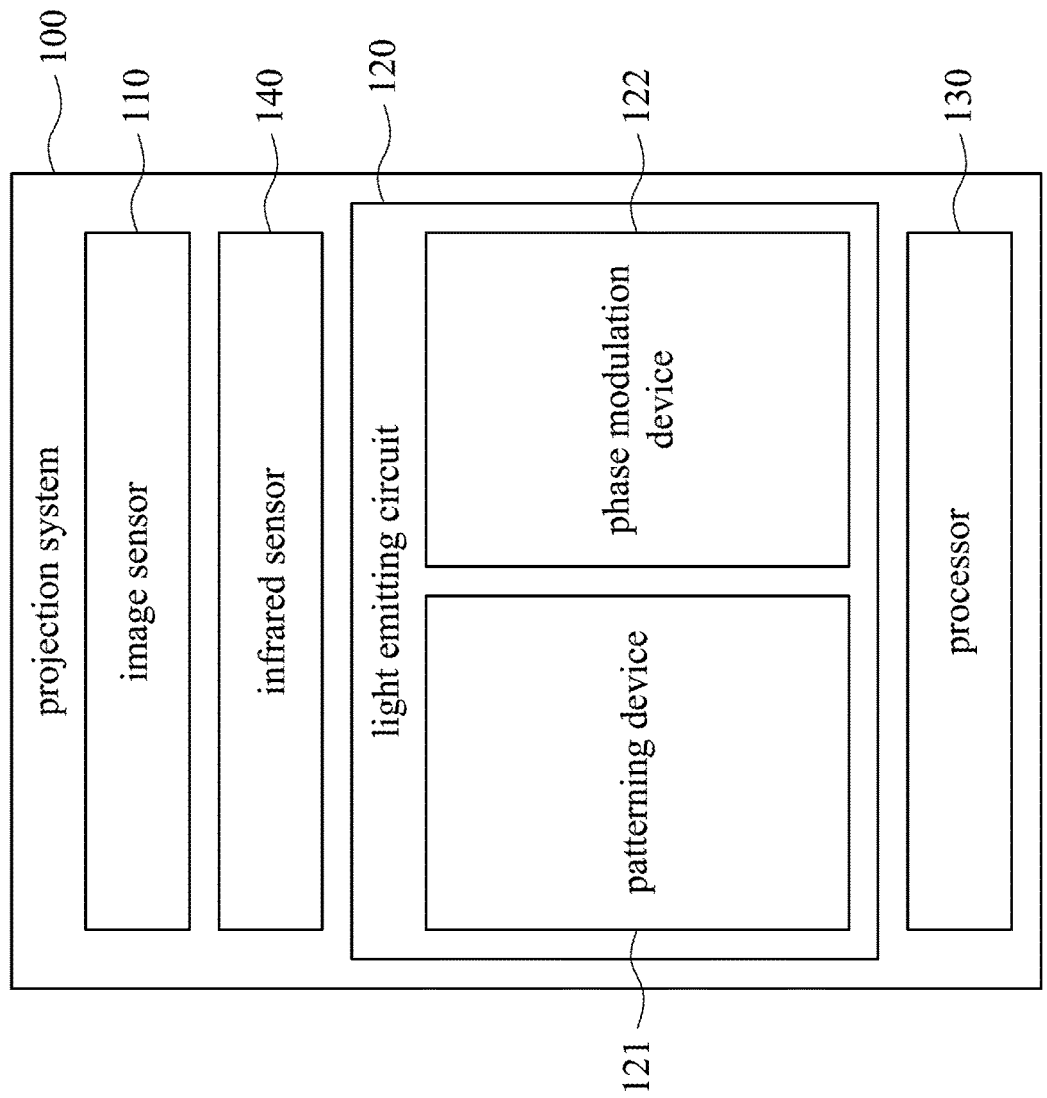
FIG. 1 is a schematic diagram of an optical projection system according to some embodiments of present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of an optical projection system 100 according to some embodiments of present disclosure. The optical projection system 100 includes an image sensor 110, a light emitting circuit 120, a processor 130 and an infrared sensor 140. In some embodiments, the image sensor 110, the light emitting circuit 120, and the infrared sensor 140 are all electrically coupled to the processor 130. The light emitting circuit 120 includes a patterning device 121 and a phase modulation device 122. It is noted that the processor 130 may be electrically coupled to at least one memory (not shown) to fetch instructions. By executing the instructions, the processor 130 may perform certain predetermined processes associated with other mentioned components of the optical projection system 100. Such predetermined processes performed by the processor 130 are described in following paragraphs.

It is noted that, in some embodiments, the optical projection system 100 may be integrated with a mobile device. In this case, the image sensor 110, the light emitting circuit 120, and the infrared sensor 140 may be oriented to a specific direction determined by the mobile device. For example, the optical projection system 100 may be oriented to a front side of the mobile device. When the mobile device is held by a user, the image sensor 110, the light emitting circuit 120 and the infrared sensor 140 are directed to the user's face.

Figure 2:
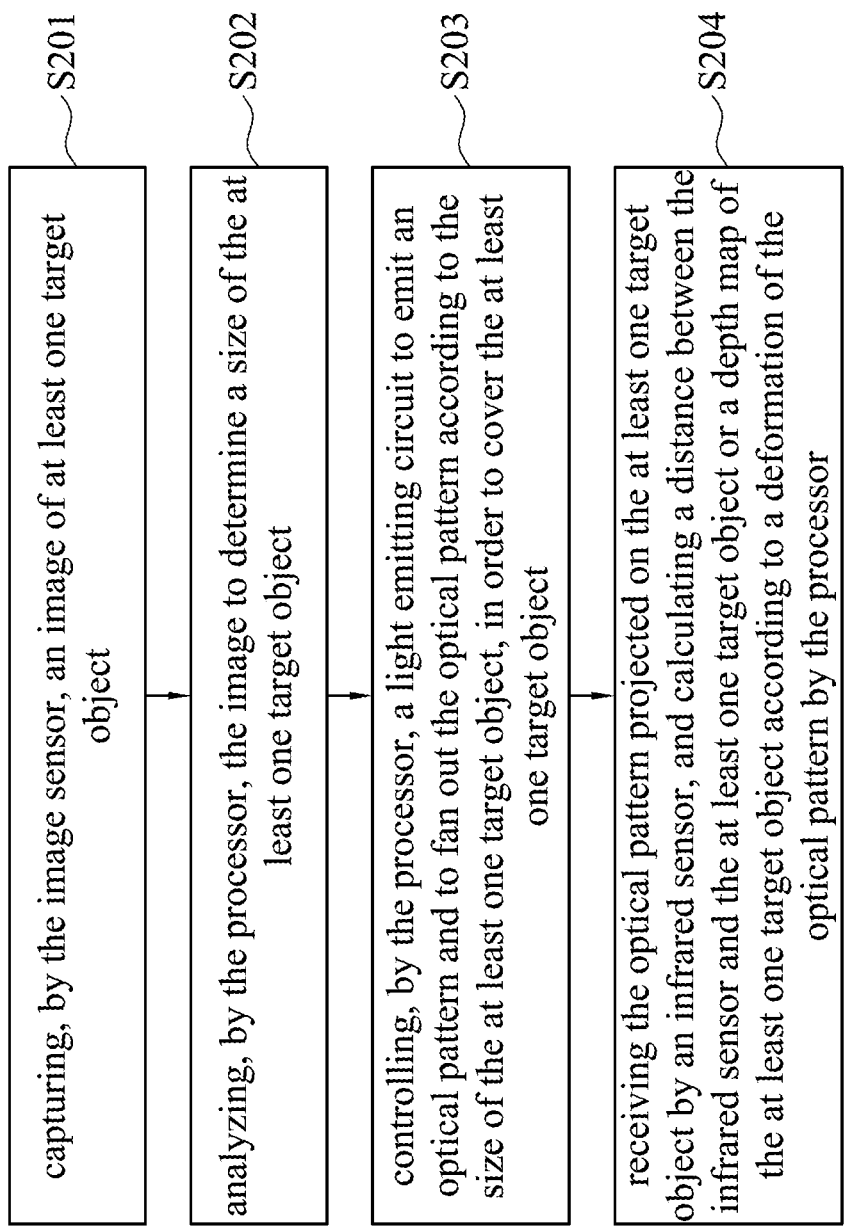
FIG. 2 is a flow chart of an optical projection method according to some embodiments of present disclosure.

FIG. 2 is a flow chart of an optical projection method according to some embodiments of present disclosure. The optical projection method may be executed by the optical projection system 100 shown in FIG. 1. Thus, the details of the components of the optical projection system 100 may be referred to FIG. 1. The steps of the optical projection method are described in following paragraphs.

Step S201: capturing, by the image sensor 110, an image of at least one target object.

Figure 3B:
FIG. 3B is a schematic diagram of images captured by the image sensor according to some embodiments of present disclosure.
Figure 3A:
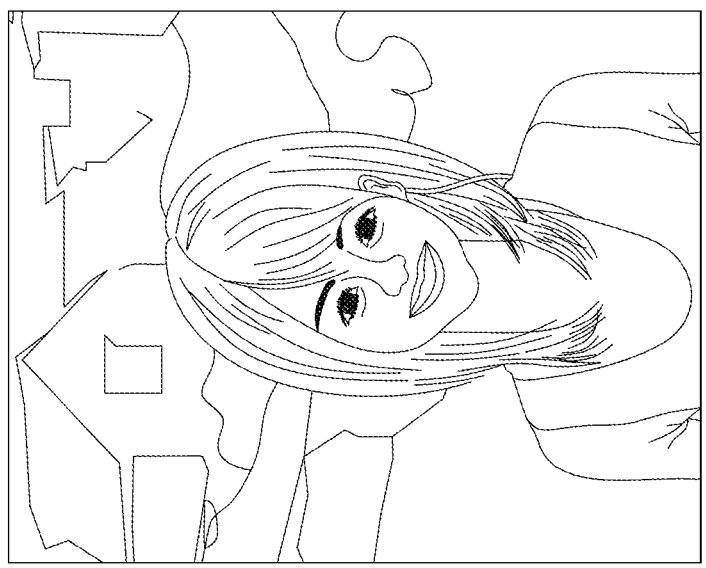
FIG. 3A is a schematic diagram of images captured by the image sensor according to some embodiments of present disclosure.

In some embodiments of FIG. 1, the image sensor 110 may be, for example but not limited to, a RGB sensor (or camera) having a field of view. In the field of view, the image sensor 110 may capture images with color. The at least one target object captured in the images may be a portion of living objects (e.g. face of human) and/or a portion of backgrounds (e.g. coins on table). In the above example where the optical projection system 100 is oriented to one side of the mobile device, the images captured by the image sensor 110 may include information regarding body parts of the user, such as the face. The body parts of the user, in this case, are the target objects being captured in the images. For better understandings, reference may be made to FIG. 3A, which is a schematic diagram of images captured by the image sensor 110 according to some embodiments of present disclosure. An exemplary image, including backgrounds and a human face, captured by the image sensor 110 is shown in FIG. 3A.

Step S202: analyzing, by the processor 130, the image to determine a size of the at least one target object.

As mentioned, the image sensor 110 may capture images with colors. The images captured by the image sensor 110 may be delivered to the processor 130 for analysis. More specifically, the processor 130 may analyze a size of the at least one target object. For example, if the image sensor 110 captures the exemplary image shown in FIG. 3A, the processor 130 may select the user's face in the image as the at least one target object and determines the size of it. As shown in FIG. 3A and FIG. 3B, the size of the user's face may be estimated by following steps. It is noted that FIG. 3B is also a schematic diagram of images captured by the image sensor 110 according to some embodiments of present disclosure.

Firstly, according to the captured images, the processor 130 may detect edges of the at least one target object. As mentioned, the images captured by the image sensor 110 contain information of colors (e.g., pixel values). In some embodiments, the processor 130 may identify pixels (or points) in the images at which the image brightness or the image color changes sharply or has discontinuities, in order to detect edges of the target object. For instance, portions of objects, such as human limbs or lawn in front of house, are in similar colors or brightness. Therefore, by analyzing the information of colors in the images, the processor 130 may approximately determine edges of objects in the images. In the embodiment of FIG. 3B, edge detection of the user's face (i.e., dotted area) may be established by a contrast between colors of human skins and colors of backgrounds.

The operations for detecting the edges are given for illustrative purposes. Various operations to detect the edges are within the contemplated scope of the present disclosure.

Secondly, the processor 130 may analyze the image, in order to locate at least one target object. It is noted that, in some embodiments, once the at least one target object is located, the processor 130 may adjust the image sensor 110 to focus on the at least one target object. Then, the image sensor 110 may capture images containing the at least one target object with higher clarity. In this case, the processor 130 may detect edges of the at least one object in the images with higher clarity.

Thirdly, according edges of the at least one target object, the processor 130 may calculate the size of the at least one target object. More specifically, the size of the at least one target object may be calculated according to the pixels representing the at least one target object in the image. For example, once the edges of the at least one object are determined, a first number of the pixels within the area formed the edges may be determined as the pixels representing the at least one target object. If the captured images are in a specific resolution containing a second number of pixels, the ratio of the first number and the second number may be calculated, in order to find out the size of the at least one object. In the embodiment shown in FIG. 3A, the size of the user's face may be determined according to above processes.

Step S203: controlling, by the processor 130, the light emitting circuit 120 to emit an optical pattern and to fan out the optical pattern according to the size of the at least one target object, in order to cover the at least one target object.

In some embodiments of FIG. 1, the light emitting circuit 120 is configured to emit light beams to form an optical pattern. It is noted that the light emitting circuit 120 is aimed to project the optical pattern onto the at least one target object. The light emitting circuit 120 may emit light beams through several available approaches. For illustrative purposes, some of the available approaches are described below, but the present disclosure is not limited thereto.

Figure 4A:
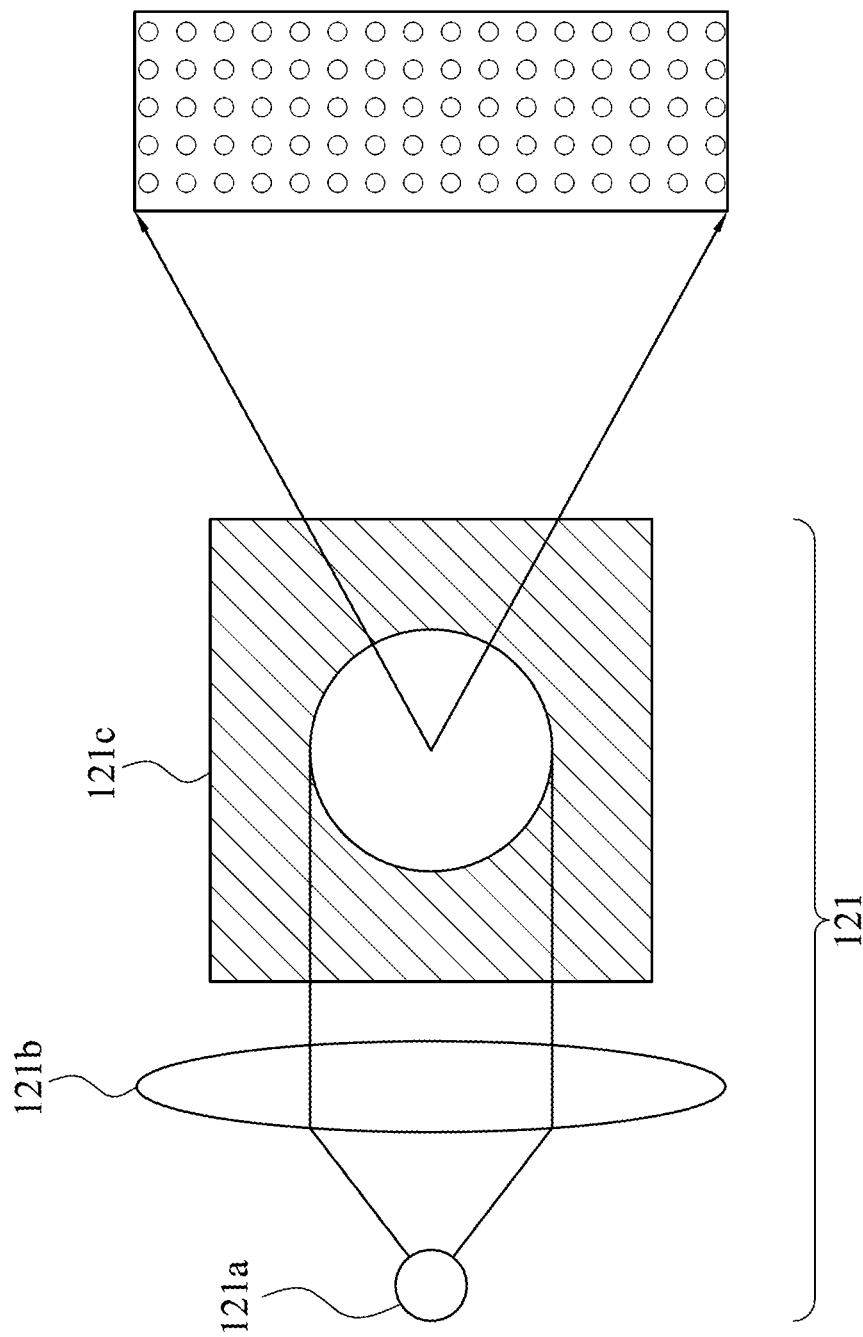
FIG. 4A is a schematic diagram of the patterning device according to some embodiments of present disclosure.

In some embodiments, in order to form the optical pattern, the light emitting circuit 120 may be configured with an edge emitting laser (EEL) source. As shown in FIG. 1, the light emitting circuit 120 includes the patterning device 121 and the phase modulation device 122. For better understandings, the reference may be made to FIG. 4A. FIG. 4A is a schematic diagram of the patterning device 121 in FIG. 1 according to some embodiments of present disclosure. In some embodiments of FIG. 4A, the light emitting circuit 120 includes an EEL source 121*a*, a lens 121*b*, and a tile diffractive optical element 121*c*. As shown in FIG. 4A, the EEL source 121*a*, the lens 121*b*, and the tile diffractive optical element 121*c* are aligned in a row, so that the laser beam emitted by the EEL source 121*a* may be guided to the tile diffractive optical element 121*c* via the lens 121*b*. It is noted that the tile diffractive optical element 121*c* is settled to diffract the collimated laser beam projected thereon into several laser beams according to a specific structured pattern. When the laser beams are emitted toward objects, the specific structured pattern formed by laser dots may be projected on at least one surface of these objects.

Figure 4B:
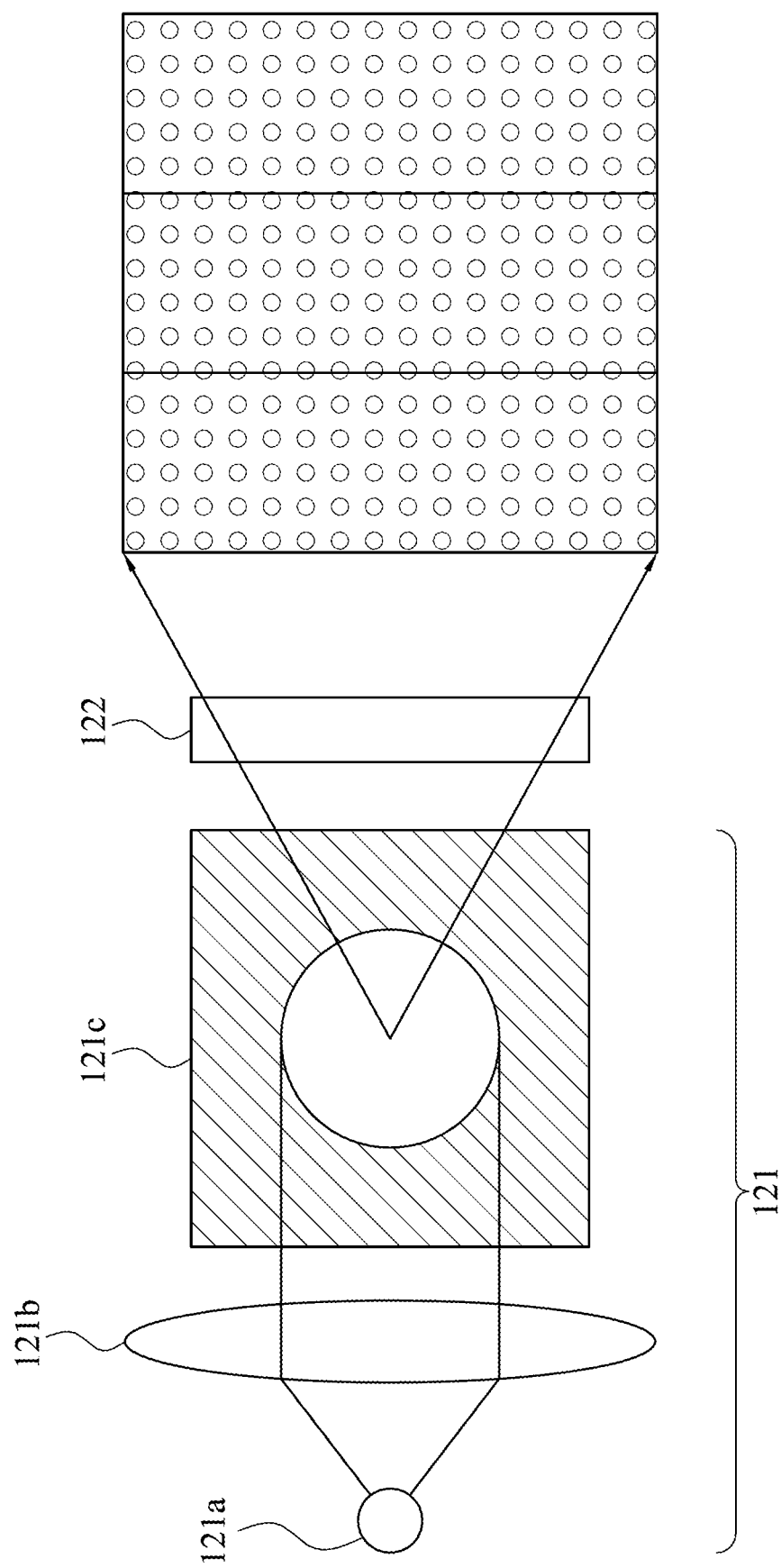
FIG. 4B is a schematic diagram of an arrangement of the patterning device and the phase modulation device according to the embodiment of FIG. 4A.

FIG. 4B is a schematic diagram of an arrangement of the patterning device 121 in FIG. 4A and the phase modulation device 122 in FIG. 1, according to some embodiments of the present disclosure. In some embodiments of FIG. 4B, the phase modulation device 122 is disposed next to the tile diffractive optical element 121c, in FIG. 4A. As shown in FIG. 4B, the edge emitting laser source 121a, the lens 121b, the tile diffractive optical element 121c, and the phase modulation device 122 are aligned in row. The phase modulation device 122 is configured to modulate the laser beams projected thereon. Therefore, through the phase modulation device 122, the optical pattern diffracted by the tile diffractive optical element 121c may be fanned out as a plurality of optical pattern duplications, as shown in FIG. 4B.

Figure 4C:
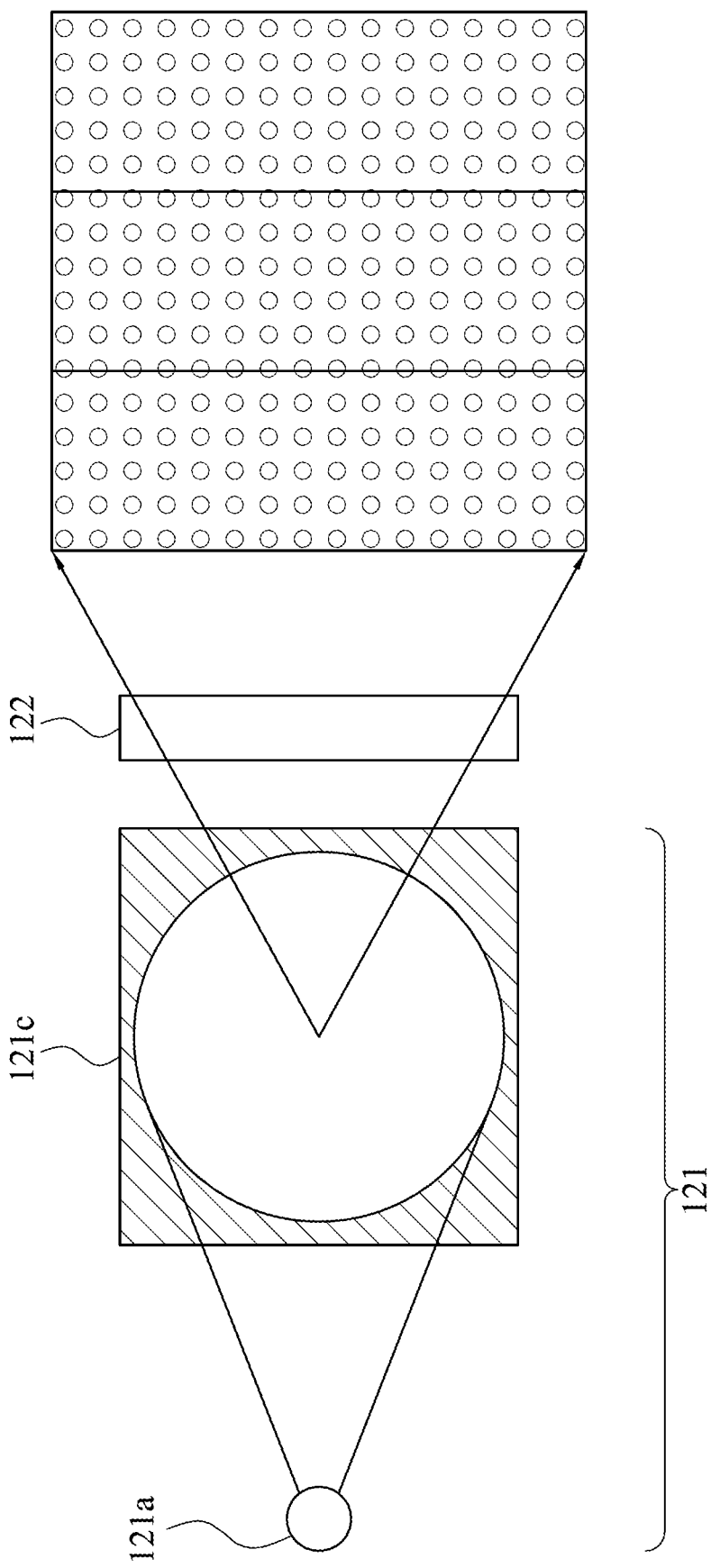
FIG. 4C is a schematic diagram of an arrangement of the patterning device and the phase modulation device according to some embodiments of the present disclosure.

FIG. 4C is a schematic diagram of another arrangement of the patterning device 121 and the phase modulation device 122 in FIG. 1 according to some embodiments of the present disclosure. In some embodiments, the light emitting circuit 120 includes an EEL source 121 and a tile diffractive optical element 121c only. As shown in FIG. 4C, the EEL source 121a and the tile diffractive optical element 121c are aligned in a row. In this case, the uncollimated laser beam emitted by the EEL source 121a may be guided to the tile diffractive optical element 121c directly. The tile diffractive optical element 121c may diffract the uncollimated laser beam into several laser beams according to a specific structured pattern. The phase modulation device 122 is configured to fanned out the specific structured pattern as a plurality of optical pattern duplications, as shown in FIG. 4C.

Figure 5A:
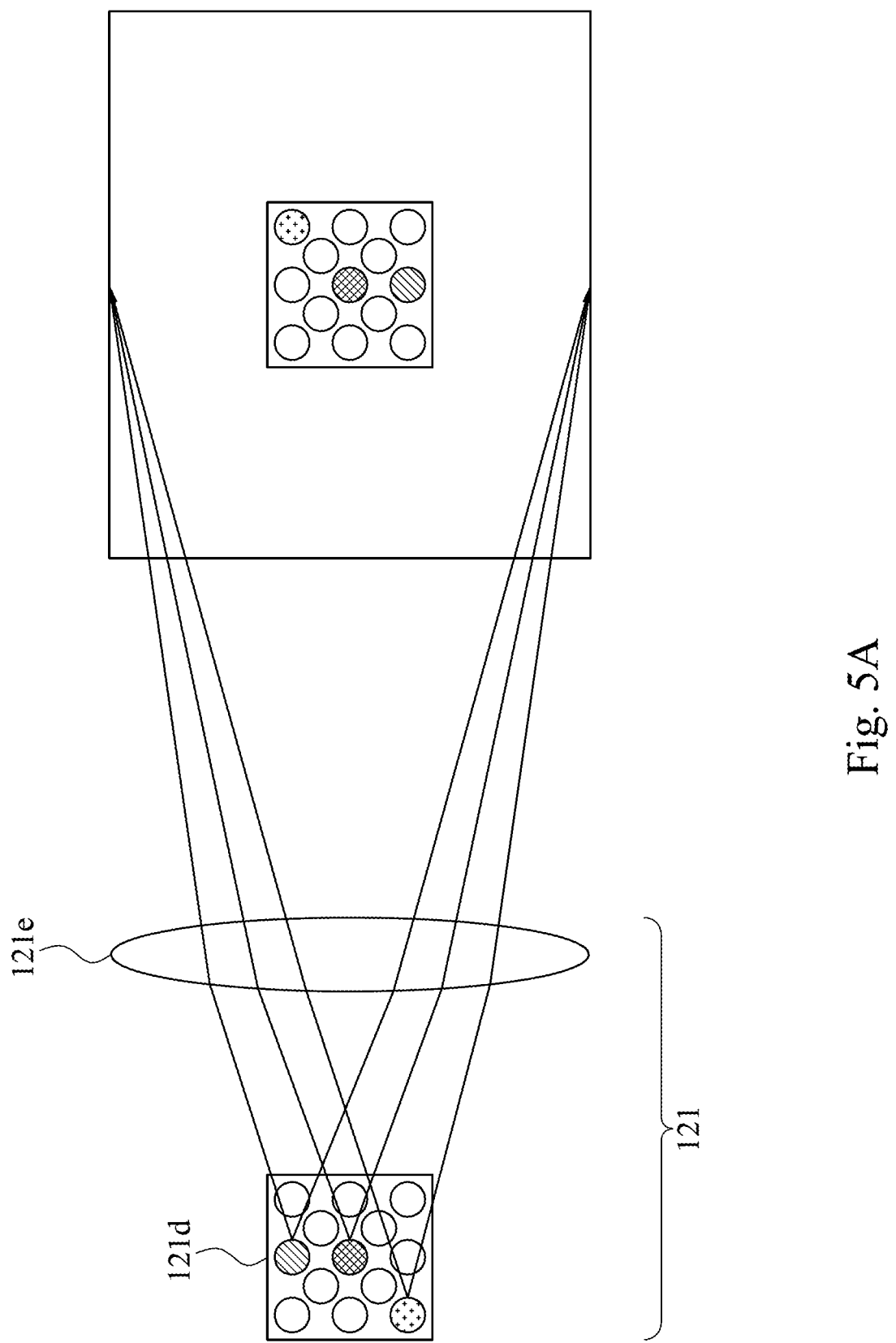
FIG. 5A is a schematic diagram of the patterning device according to some embodiments of present disclosure.

In some embodiments, to form the optical pattern, the light emitting circuit 120 may be configured with vertical cavity surface emitting laser (VCSEL) array. For better understandings, reference may be made to FIG. 5A. FIG. 5A is a schematic diagram of the light emitting circuit 120 in FIG. 1 according to some embodiments of present disclosure. In some embodiments of FIG. 5A, the light emitting circuit 120 includes a VCSEL array 121d and a lens 121e. As shown in FIG. 5A, the VCSEL array 121d and the lens 121e are aligned in row so that the laser beam emitted by the VCSEL array 121d may be guided to the lens 121e. It is noted that the VCSEL array 121d is settled to emit laser beams according to a specific structured pattern. When the laser beams being emitted toward objects via the lens 121e, the specific structured pattern formed by laser dots may be projected on at least one surface of these objects.

Figure 5B:
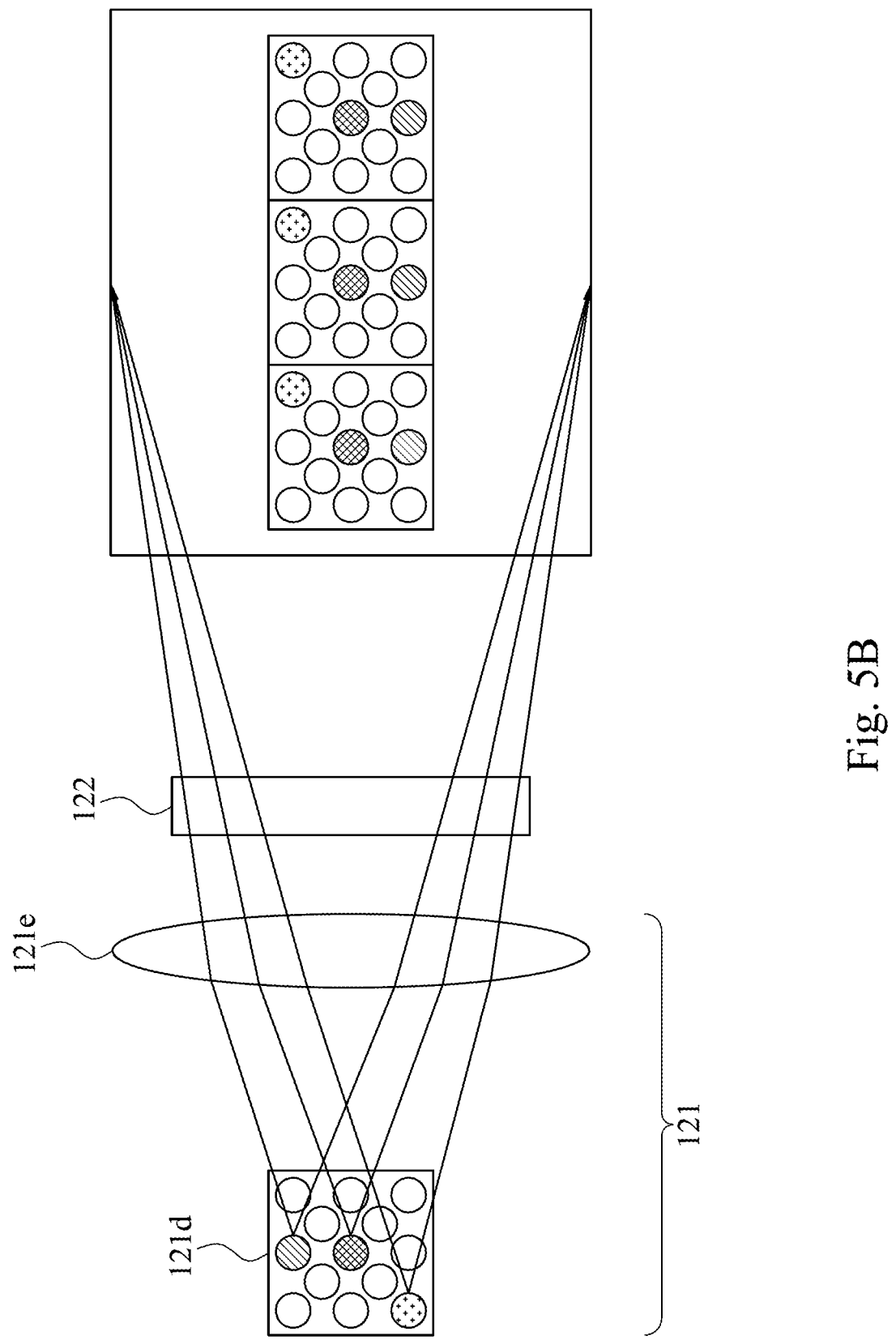
FIG. 5B is a schematic diagram of the patterning device and the phase modulation device according to the embodiment of FIG. 5A.

FIG. 5B is a schematic diagram of an arrangement of the patterning device 121 in FIG. 5A and the phase modulation device 122 in FIG. 1 according to some embodiments of the present disclosure. In some embodiments of FIG. 5B, the phase modulation device 122 is disposed next to the lens 121e shown in FIG. 5A. As shown in FIG. 5B, the VCSEL array 121d, the lens 121e, and the phase modulation device 122 are aligned in a row. The phase modulation device 122 is configured to fan out the laser beams projected thereon. Therefore, through the phase modulation device 122, the optical pattern emitted by the VCSEL array 121d may be fanned out as a plurality of optical pattern duplications, as shown in FIG. 5B.

Figure 5C:
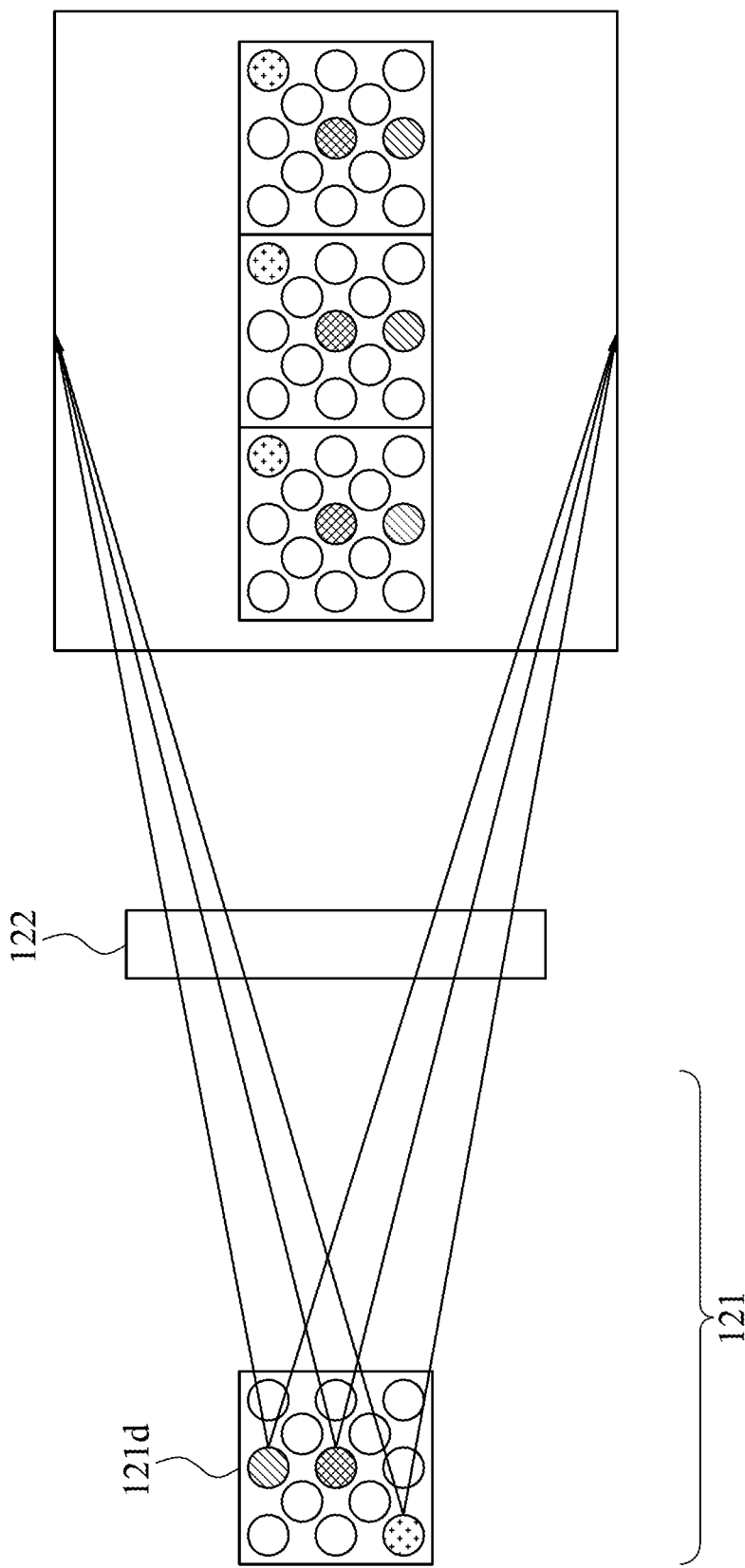
FIG. 5C is a schematic diagram of an arrangement of the patterning device and the phase modulation device according to some embodiments of the present disclosure.

FIG. 5C is a schematic diagram of another arrangement of the patterning device 121 and the phase modulation device 122 in FIG. 1 according to some embodiments of the present disclosure. In some embodiments, the light emitting circuit 120 includes the VCSEL array 121d. As shown in FIG. 5A, the uncollimated laser beam emitted by the VCSEL array 121d may be guided to the phase modulation device 122 directly. The phase modulation device 122 is configured to fan out the laser beams projected thereon. Therefore, through the phase modulation device 122, the optical pattern emitted by the VCSEL array 121d may be fanned out as a plurality of optical pattern duplications, as shown in FIG. 5C.

It is noted that, in some embodiments of FIG. 4B-4C and FIG. 5B-5C, the phase modulation device 122 is configured to fan out the optical pattern duplications along horizontal directions, but the present disclosure is not limited thereto. In some other embodiments, the optical pattern duplications may be fanned out along vertical directions. Thus, it should be understood that, in various embodiments, a combination of multiple phase modulation device 122 may project optical pattern duplications along both horizontal and vertical directions simultaneously.

Moreover, in some embodiments of FIG. 4B-4C and FIG. 5B-5C, the phase modulation device 122 may be established in several approaches. In some embodiments, the phase modulation device 122 may be implemented with a diffractive optical element configured with tunable pitches. In this approach, the laser beams projected on the phase modulation device 122 may be diffracted by determining pitch of grating. In some other embodiments, the phase modulation device 122 may be tuned by an iterative Fourier transform algorithm (IFTA). In this approach, the laser beams projected on the phase modulation device 122 may be diffracted by determining electrical field distribution.

As described in the embodiments of FIG. 3A and FIG. 3B, the processor 130 may select the user's face in the image as the at least one target object and determine the size of the user's face. In some embodiments, the processor 130 is configured to control the light emitting circuit 120, so as to fan out the optical pattern duplications toward the user in front of the mobile device. For better power efficiency, the optical pattern duplications emitted by the light emitting circuit 120 are projected to cover the user's face only, instead of the entire space. In some embodiments, the optical pattern duplications have a size that is matched to (substantially equal to) the size of the user's face. In other words, a decent approach for emitting laser beams is to control a field of view (FOV) of the light emitting circuit 120 to focus on the at least one target object (e.g., a user's face).

As mentioned in foregoing embodiments, a pixel number ratio of the image and the edges of the target object may be calculated to determine the size of the target object. In the embodiment shown in FIG. 3A and FIG. 3B, if a FOV of the image sensor 110 is about 60 degrees, a width of the image corresponds to 720 pixels and a width of the edge of the user's face corresponds to 360 pixels, it may be calculated that the focused FOV for covering the user's face is about 32.2 degrees. The calculation may be achieved by following formula: θ=2*arctan(tan(FOV/2)*h/H), wherein θ is the focused FOV, h is the width of the target object, and H is the width of the image. It is to say, if a full FOV for the light emitting circuit 120 to cover the range of the image being captured is 60 degrees, the focused FOV for the light emitting circuit 120 to cover the user's face can be about 32.2 degrees, which is around half the full FOV.

It is noted that the values given herein are for illustrative purposes only. Various values for the FOV, the width and the length of the target object are within the contemplated scope of the present disclosure.

Figure 6:
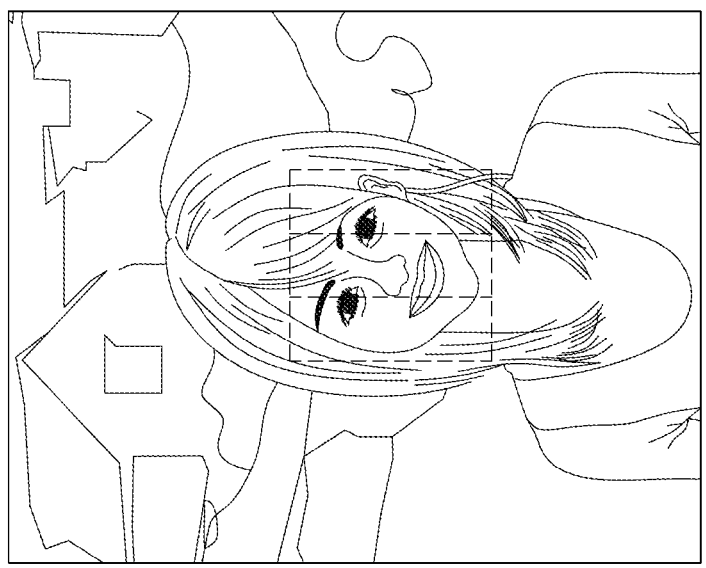
FIG. 6 is a schematic diagram of a projection example according to some embodiments of present disclosure.

For better understandings, reference may be made to FIG. 6. FIG. 6 is a schematic diagram of a projection example according to some embodiments of present disclosure. The image illustrated in FIG. 6 is similar to the embodiments of FIG. 3A and FIG. 3B, a user's face is selected as the at least one target object by the processor 130. In some embodiments where the light emitting circuit 120 is configured with VCSEL source, as shown in FIG. 5A-5B, and a single optical pattern being projected by the light emitting circuit 120 may cover a FOV for about 10.61 degrees. As mentioned, the focused FOV for the light emitting circuit 120 to cover the user's face is about 32.2 degrees. It is to say, a true result for the non-overlapped optical pattern duplications to cover the user's face may be calculated as 3, approximately. The result may be calculated by following formula: N=sin (θ/2)/sin(φ/2), wherein N is the raw result, θ is the focused FOV, and φ is the FOV that the single optical pattern may cover. It is noted that the true result is determined as the smallest odd integer larger than N. That is, in order to cover the user's face, the processor 130 may control the light emitting circuit 120 to fan out the optical pattern as three duplications along the horizontal direction. Thus, the light dots projected by the light emitting circuit 120 may be spread on the user's face, effectively.

As mentioned, in some embodiments, a combination of multiple phase modulation devices 120 may project optical pattern duplications along both horizontal and vertical directions simultaneously. Thus, if it is determined that, in order to match the size of the at least one target, the at least one target object is covered by duplications along both directions, the processor 130 may control the light emitting circuit 120 with multiple phase modulation devices 120 to project optical pattern duplications along both directions. In this case, no matter what the size of at least one target object is, the processor 130 may determine a decent projection for the at least one target object to be covered by the optical pattern duplications.

Figure 7:
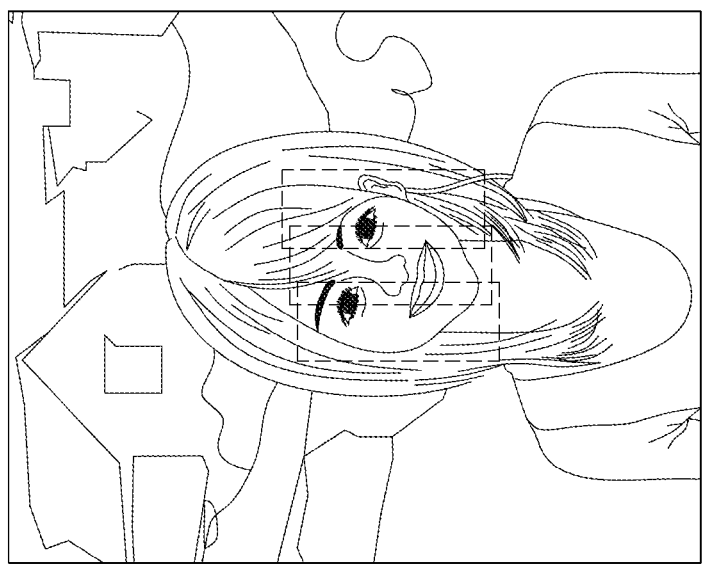
FIG. 7 is a schematic diagram of a projection example according to some embodiments of present disclosure.

For better understandings, reference may be made to FIG. 7. FIG. 7 is a schematic diagram of a projection example according to some embodiments of present disclosure. It is noted that, in some embodiments, the optical pattern duplications projected by the light emitting circuit 120 can be overlapped. More specifically, depends on the applications or the size of the target objects, the light emitting circuit 120 may emit laser beams to form overlapped optical pattern duplications, in order to cover target objects with higher density of laser dots preferably. For example, as shown in the figure, if a target object (the user's face) is determined as a size of two and half optical pattern duplications, the light emitting circuit 120 may emit laser beams to form three partially overlapped optical pattern duplications. Thus, the dots of the optical patterns may be projected onto the in a tight manner. The approach with more dots being spotted on the user's face is able to increase an accuracy of the face detection.

Step S204: receiving the optical pattern projected on the at least one target object by an infrared sensor 140, and calculating a distance between the infrared sensor 140 and the at least one target object or a depth map of the at least one target object according to a deformation of the optical pattern by the processor 130.

As mentioned in above embodiments, the light emitting circuit 120 is configured to fan out the optical pattern as three duplications along the horizontal direction. Under this condition, the user's face, in front of the mobile device, may be covered by laser dots. In other words, present disclosure is provided to fan out the optical pattern on the user's face effectively. In this case, the infrared sensor 140 may inspect a structure of the optical patterns being projected on the user's face. Since the user's face is a surface with complicated contour, the structure of the optical patterns projected on the user's face may have deformations. The deformed optical patterns may be captured by the infrared sensor 140.

According to the deformations of the received optical patterns, the processor 130 may calculate depth of each dot on the user's face. Therefore, geometry of the user's face may be generated according to the depths and a depth map may be constructed. It is noted that the approach of present disclosure may be applied to a field other than human face detection. As mentioned, the processor 130 may control the light emitting circuit 120 to fan out optical patterns in an efficient manner, in order to only cover the object of interest (which is, for example, a user's face). Thus, compared to related approaches, the efficiency for object detection can be significantly increased.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical projection system, comprising:
an image sensor, configured to capture an image of a target object;
a light emitting circuit; and
a processor, electrically coupled to the image sensor and the light emitting circuit, the processor is configured to:
analyze the image to determine a size of the target object; and
control the light emitting circuit to emit an optical pattern and to fan out the optical pattern according to the size of the target object, in order to cover the target object, wherein the light emitting circuit comprises a light source configured to emit light beams and a phase modulation device configured to modulate the light beams to form a plurality of duplications of the optical pattern derived from a same one of the light source, each of the duplications covers only a portion of the target object, and a combination of the duplications covers the target object.

2. The optical projection system of claim 1, wherein the light emitting circuit comprises:
a patterning device comprising the light source, wherein the processor is further configured to:
obtain a width of the target object;
calculate a focused field of view according to a following equation (1):

$$\theta = 2*\arctan(\tan(FOV/2)*h/H) \qquad (1)$$

wherein θ is the focused field of view, h is the width of the target object, H is a width of the image, FOV is a field of view of the image sensor;
calculate a raw result according to a following equation (2):

$$N = \sin(\theta/2)/\sin(\varphi/2) \qquad (2)$$

wherein N is the raw result, φ is a field of view that a single one of the duplications is capable of covering; and
determine that a number of the duplications is an odd integer larger than the raw result N.

3. The optical projection system of claim 2, wherein at least two of the duplications of the optical pattern are overlapped.

4. The optical projection system of claim 2, wherein the light source is an edge emitting laser source, and the patterning device further comprises:

a tile diffractive optical element, configured to diffract the light beams to form the optical pattern and to guide the optical pattern formed by the light beams to the phase modulation device, wherein the light beams are uncollimated light beams.

5. The optical projection system of claim 2, wherein the light source is an edge emitting laser source, and the patterning device further comprises:
 a lens, configured to guide the light beams as collimated light beams; and
 a tile diffractive optical element, configured to diffract the collimated light beams to form the optical pattern and to guide the optical pattern formed by the light beams to the phase modulation device.

6. The optical projection system of claim 2, wherein the light source is a vertical cavity surface emitting laser array and the light beams are uncollimated laser beams.

7. The optical projection system of claim 2, wherein the light source is a vertical cavity surface emitting laser array, and the patterning device further comprises:
 a lens, configured to guide the optical pattern formed by the light beams to the phase modulation device.

8. The optical projection system of claim 2, wherein the processor is configured to analyze the image to determine the size of the target object by at least being configured to:
 detect edges of the target object according to the image; and
 calculate the size of the target object based on the edges of the target object.

9. The optical projection system of claim 1, further comprising:
 an infrared sensor, configured to receive the optical pattern projected on the target object,
 wherein the processor is further configured to calculate a distance between the infrared sensor and the target object or a depth map of the at least one target object according to a deformation of the received optical pattern.

10. An optical projection method, comprising:
 capturing, by an image sensor, an image of a target object;
 analyzing, by a processor, the image to determine a size of the target object; and
 controlling, by the processor, a light emitting circuit to emit an optical pattern and to fan out the optical pattern according to the size of the target object, in order to cover the target object, wherein the light emitting circuit comprises a light source configured to emit light beams and a phase modulation device configured to modulate the light beams to form a plurality of duplications of the optical pattern derived from a same one of the light source, each of the duplications covers only a portion of the target object, and a combination of the duplications covers the target object.

11. The optical projection method of claim 10, wherein the step of controlling the light emitting circuit to fan out the optical pattern comprises:
 obtaining a width of the target object;
 calculating a focused field of view according to a following equation (1):

$$\theta=2*\arctan(\tan(FOV/2)*h/H) \qquad (1)$$

wherein $\theta$ is the focused field of view, h is the width of the target object, H is a width of the image, FOV is a field of view of the image sensor;
 calculating a raw result according to a following equation (2):

$$N=\sin(\theta/2)/\sin(\varphi/2) \qquad (2)$$

wherein N is the raw result, $\varphi$ is a field of view that a single one of the duplications is capable of covering; and
 determining that a number of the duplications is an odd integer larger than the raw result N.

12. The optical projection method of claim 11, wherein at least two of the duplications of the optical pattern are overlapped.

13. The optical projection method of claim 11, wherein the step of analyzing the image to determine the size of the target object comprising:
 detecting, by the processor, edges of the target object according to the image; and
 calculating, by the processor, the size of the target object based on the edges of the target object.

14. The optical projection method of claim 10, further comprising:
 receiving, by an infrared sensor, the optical pattern projected on the target object; and
 calculating, by the processor, a distance between the infrared sensor and the target object or a depth map of the at least one target object according to a deformation of the received optical pattern.

* * * * *